United States Patent
Hendrickson et al.

(10) Patent No.: US 8,358,332 B2
(45) Date of Patent: Jan. 22, 2013

(54) GENERATION OF THREE-DIMENSIONAL MOVIES WITH IMPROVED DEPTH CONTROL

(75) Inventors: Andrew Hendrickson, Burlingame, CA (US); Paul Newell, Redondo Beach, CA (US); Robert Neuman, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1153 days.

(21) Appl. No.: 12/165,039

(22) Filed: Jun. 30, 2008
(Under 37 CFR 1.47)

(65) Prior Publication Data

US 2009/0160934 A1 Jun. 25, 2009

Related U.S. Application Data

(60) Provisional application No. 60/951,424, filed on Jul. 23, 2007.

(51) Int. Cl.
*H04N 13/02* (2006.01)
*G06K 9/00* (2006.01)

(52) U.S. Cl. ............... 348/47; 348/42; 348/51; 345/419

(58) Field of Classification Search .................. 348/47, 348/42, 52; 345/419
See application file for complete search history.

(56) References Cited

U.S. PATENT DOCUMENTS

2006/0203085 A1* 9/2006 Tomita ........................ 348/51
2007/0159476 A1* 7/2007 Grasnick ..................... 345/419

FOREIGN PATENT DOCUMENTS

| EP | 1 085 769 A2 | 3/2001 |
| EP | 1085769 A2 | 3/2001 |
| EP | 1 089 573 A2 | 4/2001 |
| EP | 1089573 A2 | 4/2001 |
| WO | WO 2008/012821 A2 | 1/2008 |

OTHER PUBLICATIONS

Tanger et al., "Trinocular Depth Acquisition," SMPTE Motion Imaging Journal, May/Jun. 2007, pp. 206-212.
International Search Report PCT/US2008/070434 dated Nov. 19, 2008.
Communication pursuant to Rule 114(2) EPC dated Sep. 28, 2010 from European Patent Application No. 08782041.1, 2 pages.
Lipton, Lenny; "Foundations of the Stereoscopic Cinema: A Study in Depth"; 1982, Van Nostrand Reinhold Company, 16 pages.
Supplementary European Search Report mailed Mar. 20, 2012 in EP 08 78 2041, 5 pages.

* cited by examiner

*Primary Examiner* — Kyung H Shin
(74) *Attorney, Agent, or Firm* — Kilpatrick Townsend & Stockton LLP

(57) ABSTRACT

Techniques for creating 3-D movies allow improved control over camera positioning parameters and editing of depth in post-process to provide for a smoother variation in the viewer's convergence distance and a more pleasant viewing experience. A director can define reference parameters related to a desired viewing experience, and camera positioning parameters are derived therefrom. A depth script specifying piecewise continuous variations in reference parameters can be applied in post-process to generate 3-D shots, scenes, or movies. These techniques can be applied in both computer-generated and live-action 3-D movies.

28 Claims, 6 Drawing Sheets

GENERATION OF THREE-DIMENSIONAL MOVIES WITH IMPROVED DEPTH CONTROL

CROSS-REFERENCE TO RELATED APPLICATIONS

This application claims the benefit of U.S. Provisional Application No. 60/951,424, filed Jul. 23, 2007, entitled "Generation of Three-Dimensional Movies with Improved Depth Control," which disclosure (including any appendices thereto) is incorporated herein by reference for all purposes.

BACKGROUND OF THE INVENTION

The present invention relates in general to video clips and in particular to methods and systems for generating three-dimensional ("3-D"), or stereoscopic, video clips with improved depth control.

Human beings normally see the world using stereoscopic vision. The right eye and the left eye each perceive slightly different views of the world, and the brain fuses the two views into a single image that provides depth information, allowing a person to perceive the relative distance to various objects. Movies filmed with a single camera do not provide depth information to the viewer and thus tend to look flat.

Achieving depth in a motion picture has long been desirable, and 3-D movie technology dates back a century. Most of the early efforts used anaglyphs, in which two images of the same scene, with a relative offset between them, are superimposed on a single piece of movie film, with the images being subject to complimentary color filters (e.g., red and green). Viewers donned special glasses so that one image would be seen only by the left eye while the other would be seen only by the right eye. When the viewer's brain fused the two images, the result was the illusion of depth. In the 1950s, "dual-strip" projection techniques were widely used to show 3-D movies: two films were projected side-by-side in synchronism, with the light from each projector being oppositely polarized. Viewers wore polarizing glasses, and each eye would see only one of the two images. More recently, active polarization has been used to distinguish left-eye and right-eye images. Left-eye and right-eye frames are projected sequentially using an active direction-flipping circular polarizer that applies opposite circular polarization to the left-eye and right-eye frames. The viewer dons glasses with opposite fixed circular polarizers for each eye, so that each eye sees only the intended frames. Various other systems for projecting 3-D movies have also been used over the years.

Unlike 3-D projection technology, the camera positioning techniques used to create 3-D movies have not changed significantly over the years. As shown in FIG. 1A, in one conventional technique, two cameras 102 and 104 are set up, corresponding to the left eye and right eye of a hypothetical viewer. Each camera 102, 104 has a lens 106, 108 with a focal length f and a film back 110, 112 positioned at a distance f from lenses 106, 108. Lenses 106 and 108 each define an optical axis 111, 113. Cameras 102 and 104 are spaced apart by an "interaxial" distance $d_i$ (i.e., the distance between optical axes 111, 113 as measured in the plane of lenses 106, 108, as shown) and are "toed in" by an angle θ (the angle between the optical axis and a normal to the screen plane 115), so that the images converge on a point 114 at a distance $z_0$ from the plane of the camera lenses 106, 108. When the films from cameras 102 and 104 are combined into a 3-D film, any objects closer to the cameras than $z_0$ will appear to be in front of the screen, while objects farther from the cameras will appear to be behind the screen.

With the rise of computer-generated animation, the technique shown in FIG. 1A has also been used to position virtual cameras to render 3-D stereo images. The description herein is to be understood as pertaining to both live-action and computer-generated movies.

Three-D images generated using the technique of FIG. 1A tend to suffer from distortion. Objects toward the left or right of the image are significantly closer to one camera than the other, and consequently, the right-eye and left-eye images of peripheral objects can be significantly different in size. Such distortions can distract the viewer.

One known technique for reducing such distortions is shown in FIG. 1B. Cameras 122 and 124 are spaced apart by an interaxial distance $d_i$, but rather than being toed in as in FIG. 1A, the film backs 126 and 128 are offset from the optical axis by a distance $d_B$ as shown. Lenses 130 and 132 are oriented such that optical axes 121 and 123 are normal to screen plane 125, reducing eye-to-eye distortions. For each camera 122, 124, a film-lens axis 127, 129 is defined by reference to the center of film back 126, 128 and the center of lens 130, 132. Film-lens axes 127, 129 are effectively toed in at toe-in angle θ, and their meeting point 134 defines the convergence distance $z_0$. This technique, which has been used for computer-generated animation, reduces eye-to-eye distortion.

Regardless of which technique is used, 3-D movies suffer from problems that have limited their appeal. For example, the interaxial distance $d_i$ and toe-in angle θ are usually selected for each shot as the movie is being created. In close-up shots, for example, $d_i$ and θ are normally selected to create a relatively short convergence distance $z_0$; in wide shots, a longer $z_0$ is usually desired. During post-processing, the director often intercuts different shots to form scenes. To the extent that $d_i$ and θ are significantly different for successive shots, the viewer's eyes must discontinuously adjust to different convergence distances. Frequent discontinuous adjustments are unnatural for human eyes and can induce headaches or other unpleasant effects.

It would therefore be desirable to provide improved techniques for creating 3-D movies.

BRIEF SUMMARY OF THE INVENTION

Embodiments of the present invention provide techniques for creating 3-D movies that allow improved control over camera parameters and editing of depth in post-processing to provide for a smoother variation in the viewer's convergence distance and a more pleasant viewing experience. These techniques can be applied in both computer-generated and live-action 3-D movies.

One aspect of the present invention relates to a method for creating a three dimensional movie. A reference parameter value is established for each of a number of reference parameters that define a far triangle and a near triangle associated with a shot. The "far" triangle can be defined, for example, with reference to a point in a "zero" plane in which the offset distance between left-eye and right-eye images is zero, a distance between the zero plane and a "far" plane representing a maximum distance at which objects should be seen clearly, and an offset distance between left-eye and right-eye images for objects in the far plane. The "near" triangle can be defined, for example, with reference to the point in the zero plane, a distance between the zero plane and a "near" plane representing a minimum distance at which objects should be seen clearly, and an offset distance between left-eye and right-eye images for objects in the near plane. Thus the reference parameters characterize the stereoscopic effect. Based on these reference parameter values, camera positioning parameters are determined for a first camera and a second camera; the camera positioning parameters include an interaxial distance between the first camera and the second camera. Using the camera positioning parameters, a respective sequence of images of a shot is obtained for each of the first camera and the second camera. The sequences of images may be obtained, e.g., via animation techniques, live-action cinematography, and/or post-process techniques applied to live action or animated images.

Another aspect of the invention relates to a method for creating a movie. A number of shots is obtained, where each shot include a sequence of initial images and each initial image has depth information associated therewith. The shots are sequenced to create a scene (which may include intercutting between segments from different shots, etc.). A piecewise continuous depth script is defined for the scene. Thereafter each of the shots is regenerated as a sequence of stereoscopic images having depth properties determined based on the depth script and the depth information associated with the initial images.

The following detailed description together with the accompanying drawings will provide a better understanding of the nature and advantages of the present invention.

DETAILED DESCRIPTION OF THE INVENTION

Embodiments of the present invention provide techniques for creating 3-D, or stereoscopic, movies that allow improved control over stereoscopic parameters and/or editing of depth in post-processing to provide for a smoother variation in the viewer's convergence distance and a more pleasant viewing experience. These techniques can be applied in both computer-generated and live-action 3-D movies.

As used herein, the term "movie" should be understood to refer broadly to a sequence of images that when viewed in succession produce the effect of viewing a moving image. The images can be live-action, computer-generated, or a mix of live-action and computer-generated elements, and the sequence can have any length desired (e.g., two minutes to two or more hours). The images can be captured and/or displayed using analog or digital media, or a combination thereof (for example, a computer-generated image printed onto movie film). A "shot" refers to a subset of a movie during which camera parameters are either held constant or smoothly varied; it is contemplated that movies can include any number of shots. A "scene" refers to a subset of a movie that relates a continuous (in time and place) sequence of events, and a scene may be composed of multiple shots.

Camera Position Parameters

Some embodiments of the invention provide techniques for establishing camera position parameters for a 3-D shot. The director (or other person involved in creating a 3-D movie) defines reference parameters that characterize the 3-D image, and camera position parameters that will yield a 3-D image with the specified characteristics are derived from the reference parameters.

Figure 2:
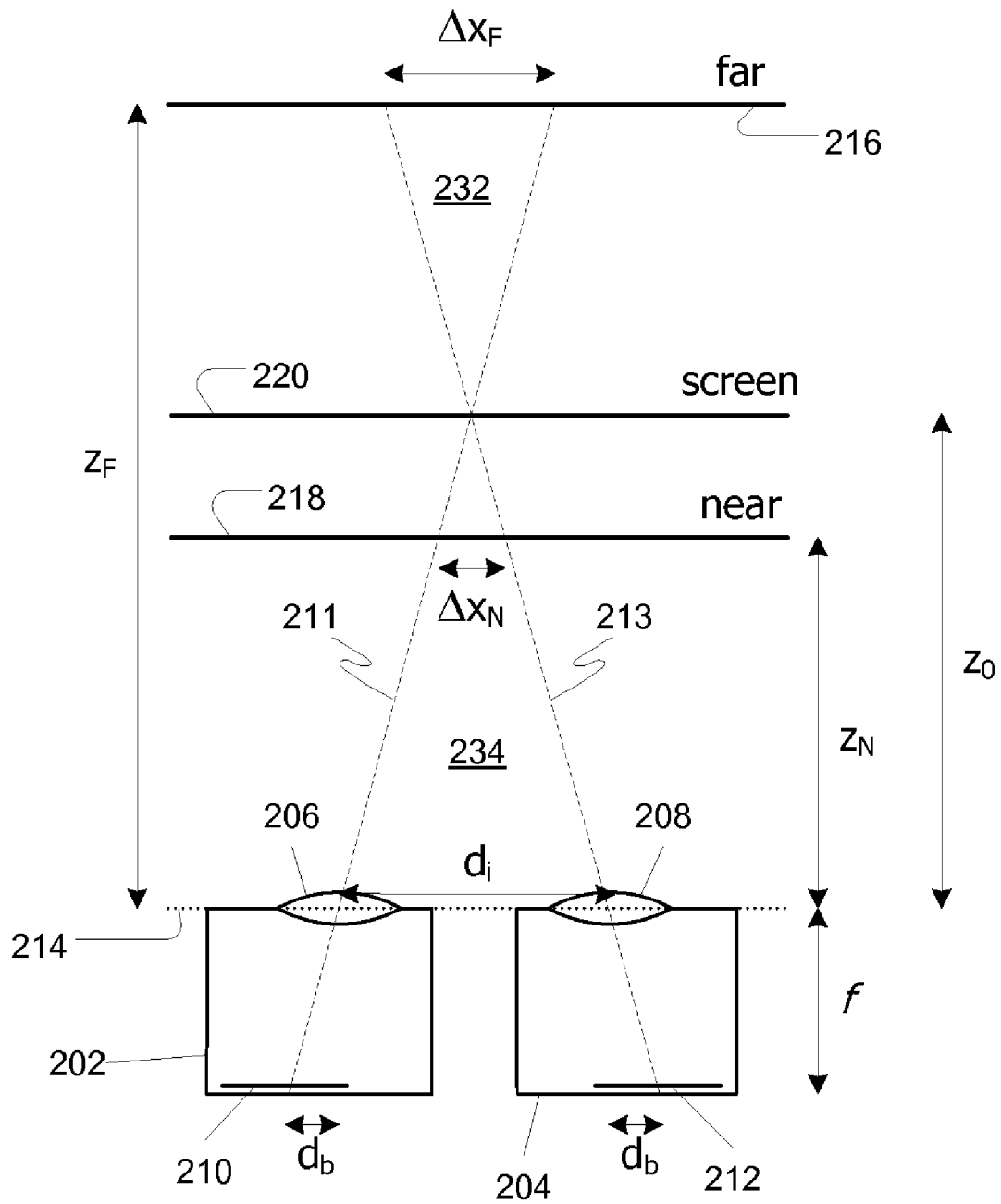
FIG. 2 is a simplified plan view illustrating a technique for establishing 3-D camera parameters according to an embodiment of the present invention.

FIG. 2 is a simplified plan view illustrating camera-related parameters according to an embodiment of the present invention. Two cameras 202, 204 are provided. Each camera has a lens 206, 208 with a focal length f and a film back 210, 212 is placed in a plane a distance f from a "camera plane" 214 (dotted line). Film backs 210, 212 are each offset by a distance $d_b$, and the center of film backs 210, 212 and centers of lenses 206, 208 define film-lens axes 211, 213.

Three other planes are shown: a "far" plane 216, a "near" plane 218, and a "screen" plane 220. Far plane 216, which is at a distance $z_F$ from camera plane 214, corresponds to the distance to the farthest object that should be seen clearly (or at all). Near plane 218, which is at a distance $z_N$ from camera plane 214, corresponds to the distance to the closest object that should be seen clearly (or at all). An offset distance between right-eye and left-eye images in far plane 216 is defined as $\Delta x_F$, and an offset distance between left-eye and right-eye images in near plane 218 is defined as $\Delta x_N$. In the screen plane, the offset distance between right-eye and left-eye images is zero. Far plane distance $z_F$, near plane distance $z_N$, screen plane distance $z_0$, and the offset distances $\Delta x_F$ and $\Delta x_F$ characterize the 3-D image as it would be experienced by a viewer.

It is to be understood that other camera parameters may be relevant to the creation of 3-D images. For example, in computer-generated animation, it is common to define a view frustum for each camera 202, 204. The view frustum specifies the boundaries of the visible volume in 3-D space for each camera (e.g., by defining a height and width for the near plane and the far plane). The view frustum for a camera may depend on parameters such as focal length and aperture of lenses 206, 208, dimensions of film backs 210, 212, and so on; the respective view frustum for each camera 202, 204 may be the same or different. For purposes of determining 3-D parameters it is sufficient to consider the plane defined by the respective film-lens axes (or in other embodiments optical axes) of the two cameras; other camera parameters may also be defined at the same time as the parameters described herein.

Figure 1A:
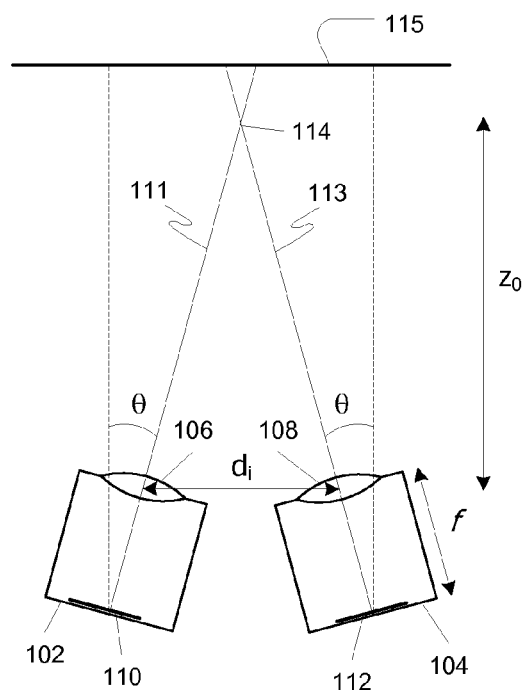
FIGS. 1A and 1B are simplified plan views illustrating conventional techniques for arranging cameras to create 3-D movies.
Figure 1B:
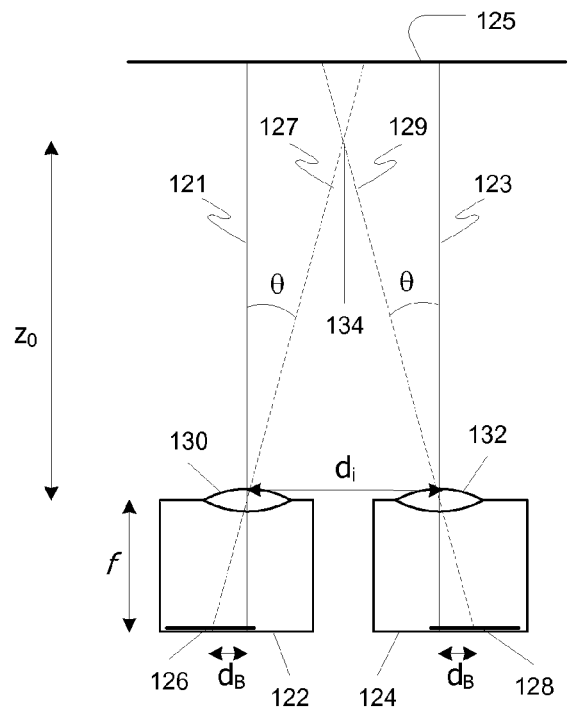

As can be seen from FIG. 2, the screen plane distance $z_0$ and the camera interaxial distance $d_I$ can be established by specifying the near plane distance $z_N$, the far plane distance $z_F$, the near-plane offset $\Delta x_N$, and the far plane offset $\Delta x_F$. The film-back offset $d_B$ can also be determined from these four parameters in combination with the focal length f of lenses 206, 208. Alternatively, if a toed-in camera arrangement (e.g., as shown in FIG. 1A) is used, the toe-in angle θ can be determined.

Figure 3:
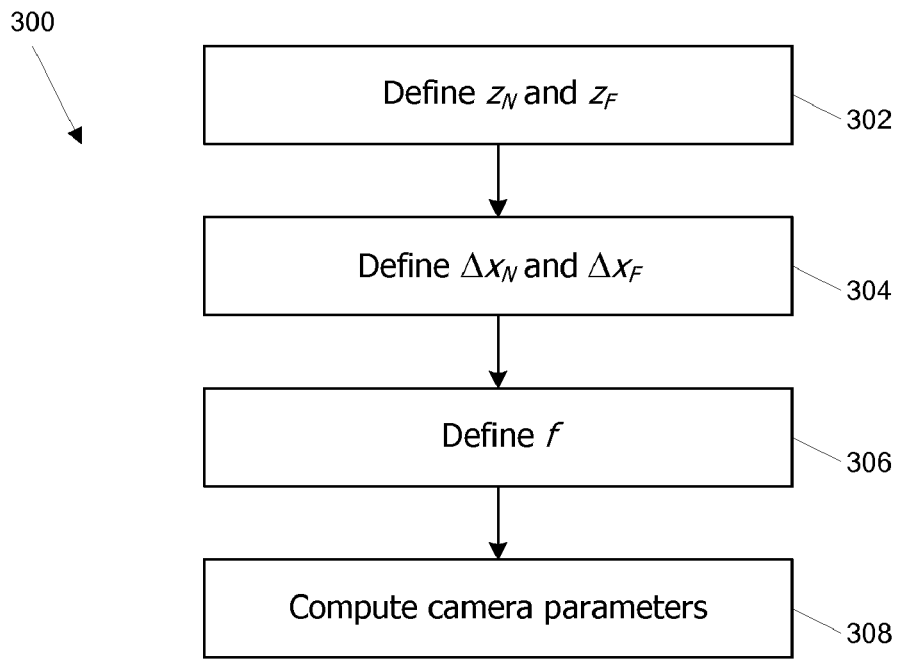
FIG. 3 is a flow diagram of a process for determining 3-D camera parameters according to an embodiment of the present invention.

FIG. 3 is a flow diagram of a process 300 for determining 3-D camera positioning parameters according to an embodiment of the present invention. At step 302, a near plane distance $z_N$ and a far plane distance $z_F$ are defined for a shot. At step 304, offset distances $\Delta x_N$ and $\Delta x_F$ are defined. At step 306, a focal length f for the camera lenses is defined. At step 308, the interaxial distance $d_i$ and film-back offset $d_B$ are computed. More generally, the camera positioning parameters can include any parameters that specify the relative positioning of the two cameras. For instance, an interaxial spacing and a toe-in angle could be used.

In some embodiments, the near-plane distance $z_N$ and far-plane distance $z_F$ are specified in absolute length units such as meters or feet, while the offset distances are specified in screen-relative units such as pixels. In general, for both analog and digital image capture, the screen area can be thought of as a grid having a fixed size (measured, e.g., in pixels), and an offset specified in pixels corresponds to a fraction of the screen size.

Figure 4:
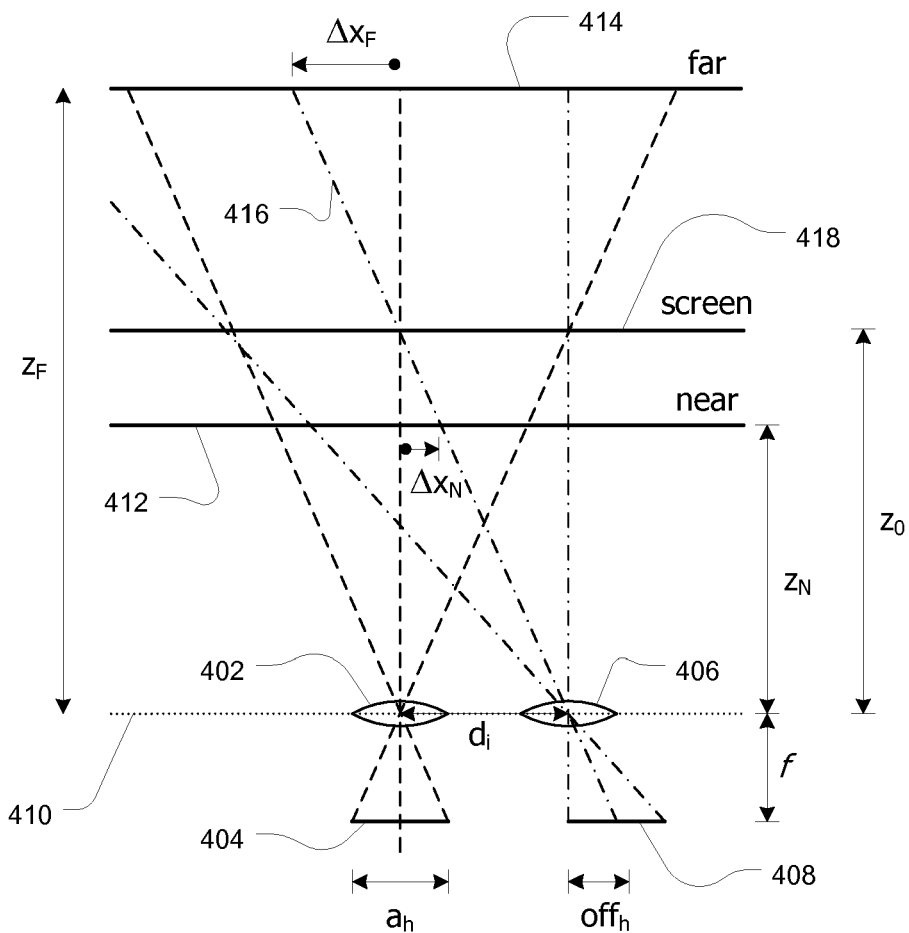
FIG. 4 is a geometric diagram illustrating computation of 3-D camera parameters according to an embodiment of the present invention.

Computation of camera positioning parameters for one such embodiment will be described with reference to FIG. 4. As shown in FIG. 4, the left-eye camera, represented by lens 402 and film back 404, is arranged with film back 404 directly behind lens 402 at a focal distance f measured in length units, such as inches or millimeters. The width of film back 404 defines a horizontal aperture $a_h$ that will be applied to both cameras. The left-eye camera is pointed straight at the screen plane.

To position the right-eye camera, represented by lens 406 and film back 408, the interaxial distance $d_i$ and the film back offset distance $\text{off}_h$ are computed. In this example, the user supplies the following reference parameters:

$z_N$, the distance from camera plane 410 to near plane 412, in absolute length units (e.g., inches, millimeters, meters, etc.);

$z_F$, the distance from camera plane 410 to far plane 414, in absolute length units (e.g., inches, millimeters, meters, etc.);

$\Delta p_N$, the image shift in near plane 412, specified as a number of pixels; and $\Delta p_F$, the image shift in far plane 414, specified as a number of pixels. When specifying $\Delta p_N$ and $\Delta p_F$ in this embodiment, positive values indicate that the right eye point is to the right of the left eye point; negative numbers indicate the opposite.

Additional per-camera parameters (which usually apply to both cameras) can be pre-specified or provided by the user. In this embodiment, the per-camera parameters include at least:

$p_H$, the horizontal resolution of the image in pixels;

f, the camera focal length, e.g., in inches or millimeters; and $a_h$, the camera's horizontal aperture, e.g., in inches or millimeters.

Other per-camera parameters, such as vertical resolution and aperture, or aspect ratio for the image, can also be specified if desired.

The horizontal field of view angle (hfov) can be determined using:

$$hfov = 2 * a\tan(0.5 * a_h/f), \quad (1)$$

assuming that horizontal aperture $a_h$ and focal length f are in the same units. (These lengths can readily be converted to the same units using appropriate conversion factors.) The width of the image in the near plane ($\text{width}_N$) is then:

$$\text{width}_N = 2 * z_N * \tan(hfov/2), \quad (2)$$

and the width of the image in the far plane ($\text{width}_F$) is:

$$\text{width}_F = 2 * z_F * \tan(hfov/2). \quad (3)$$

Note that $\text{width}_N$ and $\text{width}_F$ have the same units as $z_N$ and $z_F$ (e.g., inches, meters, etc.).

The image width can be used to convert pixel shifts to shift distances. Specifically, the near-plane shift $\Delta x_N$ is given by:

$$\Delta x_N = \text{width}_N * \Delta p_N/p_H, \quad (4)$$

and the far-plane shift $\Delta x_F$ is given by:

$$\Delta x_F = \text{width}_F * \Delta p_F/p_H, \quad (5)$$

The slope $m_C$ of the "convergence" line 416 is:

$$m_C = (z_F - z_N)/(\Delta x_F - \Delta x_N). \quad (5)$$

This slope can be used to determine the distance $z_0$ from camera plane 410 to screen plane 418:

$$z_0 = z_N - m_C * \Delta x_N. \quad (6)$$

The positioning parameters for the right-eye camera can then be determined. The interaxial distance $d_i$ is given by:

$$d_i = z_0/m_C, \quad (7)$$

and the film back offset $\text{off}_h$ for the right-eye camera is given by:

$$\text{off}_h = f/m_C \quad (8)$$

Those skilled in the art will appreciate that other techniques can be used. In addition, other camera positioning parameters can also be computed. For instance, a toe-in angle for the right-eye camera, rather than a film back offset, could be computed based on the slope $m_C$. In addition, the cameras could be positioned symmetrically (e.g., as shown in FIG. 2), and similar techniques could be used to determine positioning parameters for both cameras.

After the camera positioning parameters (e.g., interaxial spacing $d_i$ and film back offset or toe-in angle) are determined, the shot can be made. In the case of an animated shot, making the shot typically includes rendering two images of the scene data, one using the right-eye camera positioning parameters and the other using the left-eye parameters; the two rendering operations can take place in parallel or sequentially as desired. In the case of a live-action shot, making the shot can include setting up real cameras according to the positioning parameters determined at step 304 and filming the action.

The offsets between left-eye and right-eye cameras may be selected as desired. In practice, various ad hoc limits may be determined. For example, to make sure that information for both eyes is available, the offsets $\Delta x_F$ and $\Delta x_N$ should not exceed the width of the screen. In addition, there is a maximum offset distance beyond which a viewer's eyes can no longer fuse the two images; this is often less than screen width.

The examples shown in FIGS. 3 and 4 place the screen plane at the convergence distance $z_0$ from the camera plane. It is to be understood that the screen plane could be placed in front of or behind the convergence plane (or "zero plane"). However, it has been observed that a large discrepancy between the screen distance and the convergence distance can be uncomfortable for viewers; thus, it may be desirable to limit this discrepancy, e.g., by always using the zero plane as the screen plane.

Figure 5:
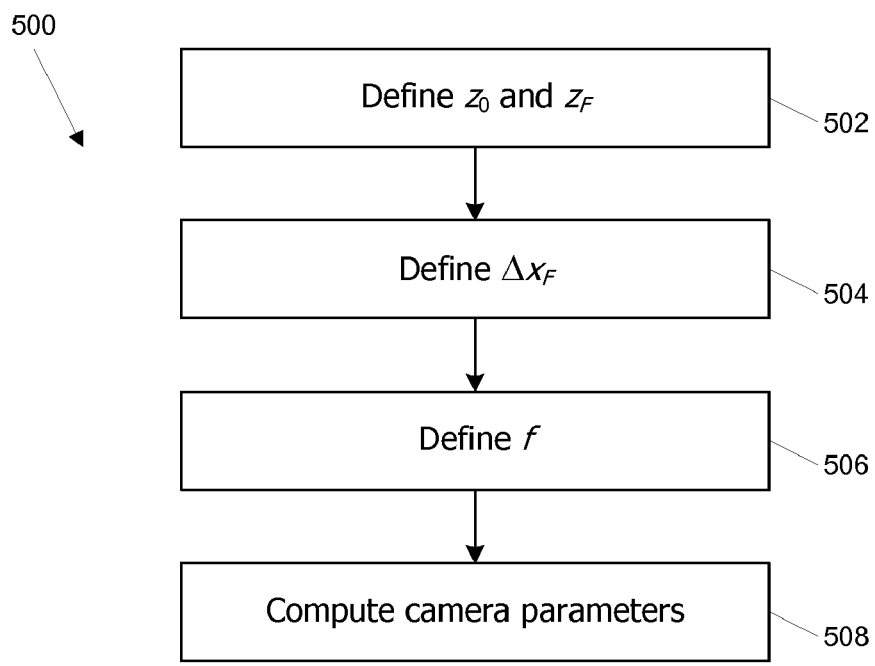
FIG. 5 is a flow diagram of a process for determining 3-D camera parameters according to another embodiment of the present invention.

In some instances, having objects appear in front of the screen plane (e.g., between screen plane 220 and near plane 218 of FIG. 2) can create distortion depending on where viewers are sitting relative to the screen. Accordingly, it may be desirable to merge screen plane 220 and near plane 218 into a single plane. FIG. 5 is a flow diagram of a process 500 for determining 3-D camera positioning parameters according to another embodiment of the present invention. Process 500 can be used, e.g., if screen plane 220 and near plane 218 of FIG. 2 are the same plane. At step 502, screen plane distance $z_O$ and far plane distance $z_F$ are defined for a shot. At step 504, far-plane offset distance $\Delta x_F$ is defined; the offset in the screen plane is always zero. (Offset distance $\Delta x_F$ can be defined directly or indirectly, e.g., using a pixel offset as described above.) At step 506, focal length f is defined. At step 508, the interaxial distance $d_i$ and film-back offset $d_B$ are computed. After that, the shot can be made, e.g., as described above.

It will be appreciated that the processes for determining camera parameters described herein are illustrative and that variations and modifications are possible. Steps described as sequential may be executed in parallel, order of steps may be varied, and steps may be modified or combined. Where toe-in angle θ is used in place of film-back offset $d_B$, the angle θ can be determined using techniques similar to those described above.

Further, the set of reference parameters that are defined by the director can be varied. Any combination of parameters that characterizes the desired 3-D properties of the image can be used. For example, in process 500 it is assumed that the screen plane and the near plane are the same. This condition is not required, and a near-plane distance $z_N$ can be specified as a separate reference parameter. It should be noted that if $z_N$, $z_O$ and $z_F$ are all used as reference parameters, only one of the offset distances $\Delta x_F$ or $\Delta x_N$ needs to be provided as a reference parameter; the other offset distance can be determined from the similarity of far triangle 232 and near triangle 234 in FIG. 2. More generally, any set of parameters sufficient to define far triangle 232 and near triangle 234 of FIG. 2 can be used as the reference parameters, and $d_i$ and $d_B$ can be computed from these parameters. Thus, any two of the following parameter sets suffice to determine the third: (1) near plane distance $z_N$ and offset $\Delta x_N$, (2) far plane distance $z_F$ and offset $\Delta x_F$; and (3) zero plane distance $z_O$. (If the screen plane is not the zero plane, an offset between the two can also be specified.)

Reference parameters may be chosen to achieve a desired look. In some cases, reference parameter values may be selected based on objects in the shot. For example, movies often feature close-up shots of a character's head (referred to as "head shots"). Often in 3-D rendering, close-up shots can make heads looked squashed. To reduce the squashed appearance, the dimensions of the character's head provide a useful guide for determining reference parameters.

Figures 6A, 6B:
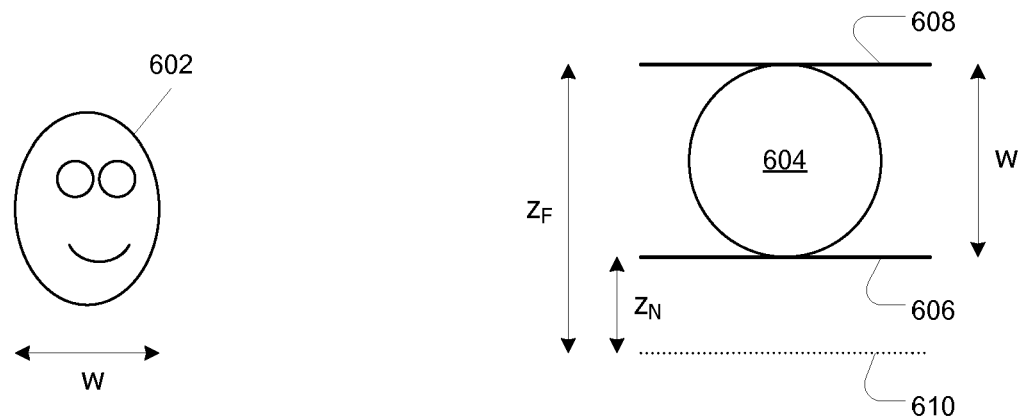
FIGS. 6A-6C illustrate techniques for defining depth parameters for a 3-D head shot according to an embodiment of the present invention.

FIGS. 6A and 6B illustrate a technique for selecting camera parameters for a head shot according to an embodiment of the present invention. FIG. 6A shows the face 602 of a character, as viewed on a screen. Face 602 can be at any angle to the screen, e.g., straight on, profile, backside, or some other angle. Face 602 has an apparent width w, which may depend on the angle at which face 602 is seen. (Apparent width w can be measured, e.g., in pixels.)

FIG. 6B is a top view showing how apparent width w can be used to define the depth parameters $z_F$ and $z_N$ according to an embodiment of the present invention. Specifically, apparent width w of FIG. 6A is used to define a circle 604 of diameter w. The cameras are represented by camera plane 610 (dotted line). Near plane 606 is at a distance $z_N$ from camera plane 610 that is determined based on how close the head shot is to be, and far plane 608 is at a distance $z_F = z_N + w$ from camera plane 610.

In some embodiments, apparent width w is used to define an initial value for $z_F$, and the initial value can be tweaked to minimize any squashing effect or to transition smoothly from shot to shot.

Figure 6C:
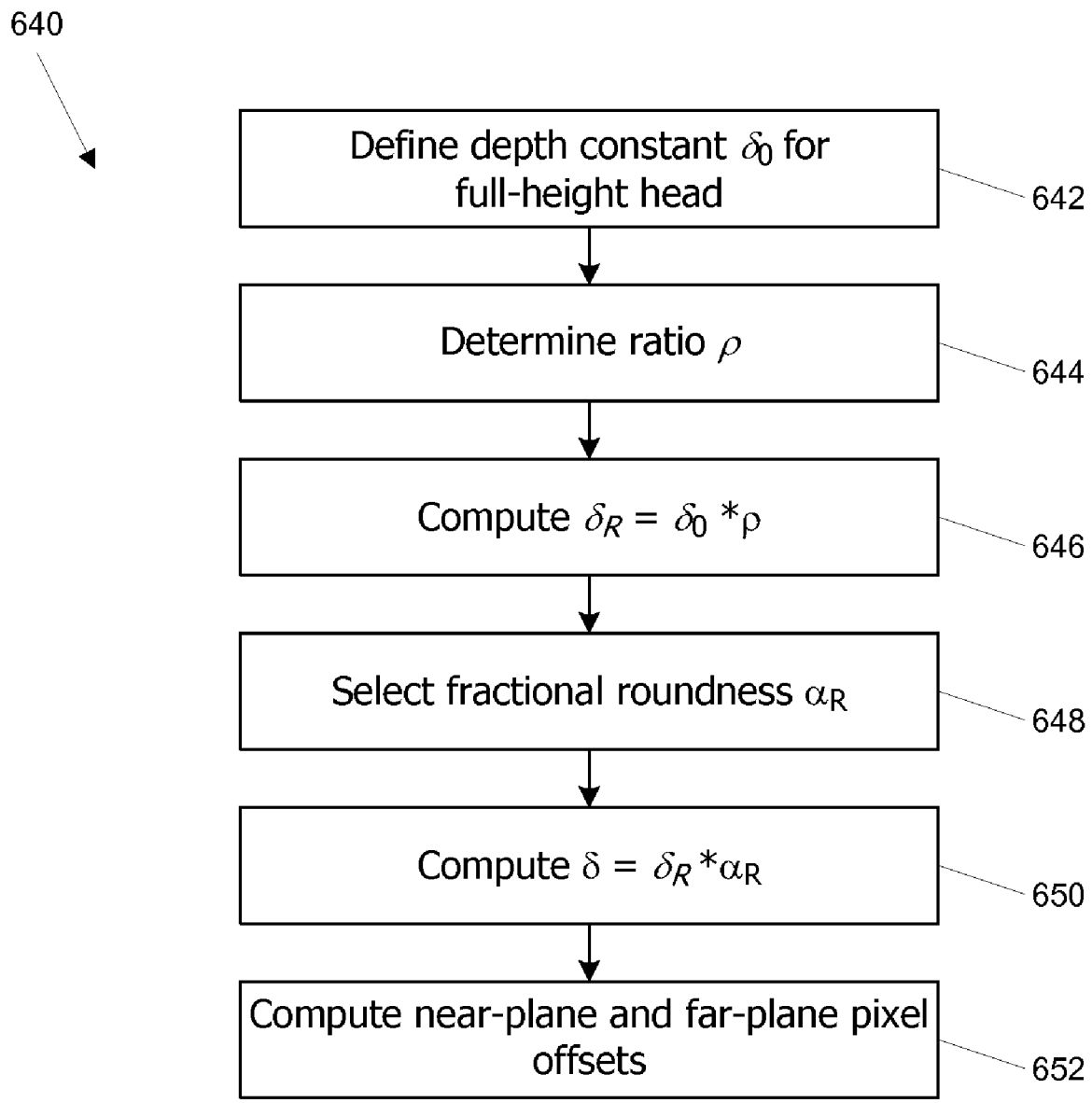

Apparent width w of a head or face (e.g., face 602 of FIG. 6A) can also be used to define pixel offsets in the near and/or far planes. FIG. 6C is a flow diagram of a process 640 that uses the apparent width of a head as shown on the screen to determine near-plane and far-plane pixel offsets $\Delta p_N$ and $\Delta p_F$. At step 642, a "depth constant" ($\delta_0$) is defined based on an image of the head when its apparent height is the full vertical height of the image. To define depth constant $\delta_0$ in one embodiment, a 3-D image of a test head that fills the vertical height of the image is rendered, with the near plane and far plane coinciding with the front and back of the head (e.g., as shown in FIG. 6B) and near plane and far plane pixel offsets $\Delta p_{N0}$ and $\Delta p_{F0}$. The pixel offsets $\Delta p_{N0}$ and $\Delta p_{F0}$ are adjusted until the test head appears fully rounded. Depth constant $\delta_0$ is then defined as:

$$\delta_0 = |\Delta p_{N0} - \Delta p_{F0}|. \tag{9}$$

At step 644, the ratio ρ is determined as the ratio of the apparent width w of the head to be rendered (measured, e.g., in pixels) to the height of the image (also measured in pixels). At step 646, an offset difference $\delta_R$ to attain a fully rounded head is computed as:

$$\delta_R = \delta_0 * \rho. \tag{10}$$

In some cases, a head that is less than fully rounded may be desired; accordingly, at step 648, the creator of the image can specify a fractional roundness $\alpha_R$ (e.g., from 0 to 1). At step 650, the near-to-far offset difference δ to be used for the image is computed as:

$$\delta = \delta_R * \alpha_R. \tag{11}$$

At step 652, the offset difference δ is used to set near-plane pixel offset $\Delta p_N$ and far-plane offset $\Delta p_F$. For instance, if the middle of the head is to be in the convergence plane, then:

$$\Delta p_N = 0.5 * \delta_R; \Delta p_F = -0.5 * \delta_R. \tag{12}$$

More generally, the offset difference δcan be added in equal and opposite measures to near-plane pixel offset $\Delta p_N$ and far-plane offset $\Delta p_F$. This provides control over the position of the convergence point relative to the subject's head while keeping the head depth constant, so that the viewer does not perceive changes in the shape of the head as the distance between the head and the camera varies. Similar techniques can be applied for close-ups of other objects.

Depth Script

In other embodiments of the present invention, the techniques for defining 3-D camera positioning parameters described above can be used to create a "depth script" for a movie. The depth script can be used to reduce discontinuities in 3-D convergence distance caused by abrupt changes in the distance $z_O$.

In some embodiments, the depth script provides smooth variations in the director-defined reference parameters (e.g., $z_F$, $z_N$, $\Delta x_F$, $\Delta x_N$) within a shot or from shot to shot within a scene. As long as the script specifies that these parameters vary continuously, the convergence distance $z_O$ also varies continuously; discontinuous changes in the director-defined reference parameter values result in discontinuous changes in $z_O$. Thus, the director can control the number and frequency of discontinuous changes in convergence distance. In particular, over the course of a movie, $z_O$ can be made to vary in a piecewise continuous manner, with fewer discontinuous jumps than previous 3-D techniques provided. For example, within a scene, $z_O$ might vary continuously, with discontinuous jumps occurring only between scenes.

Figure 7:
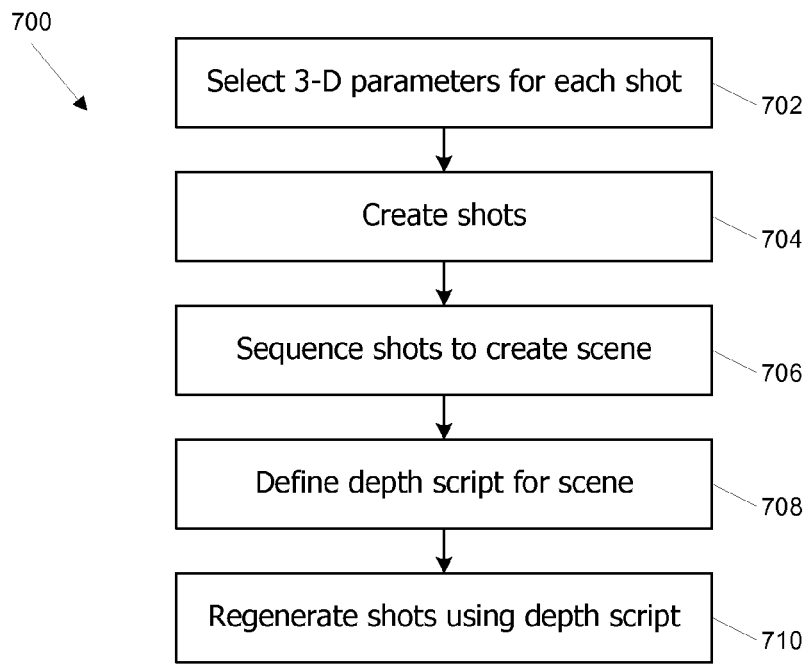
FIG. 7 is a flow diagram of a process for creating a 3-D movie according to an embodiment of the present invention.

FIG. 7 is a flow diagram of a process 700 for creating a 3-D movie according to an embodiment of the present invention.

At step 702, the director (or other responsible party) establishes initial 3-D camera positioning parameters for each shot. For example, process 300 or 500 described above could be used. At step 704, the shots are created using the initial parameters. At step 706, the shots are sequenced to create a scene. At this stage, the scene may have any number of discontinuous jumps in 3-D camera positioning parameters. At step 708, a depth script for the scene is defined. The depth script can be defined, e.g., by establishing $z_F$, $z_N$, $\Delta x_F$, and $\Delta x_N$ reference parameters for each shot such that there are few or no discontinuous jumps in the viewer's convergence distance. To provide continuity, the reference parameters can be held constant or smoothly varied as a function of time during a shot. At step 710, the shots are regenerated, using the depth script to determine the 3-D camera positioning parameters for each shot.

Depth scripting can be applied in both computer-generated and live-action 3-D movies. In the case of computer-generated movies, applying a depth script (e.g., step 710 of FIG. 7) generally entails re-rendering the images using the camera positioning parameters determined from the depth script. For live-action movies, scenes could be re-filmed, although this is usually prohibitively expensive.

As an alternative to re-filming, depth information for a live-action scene can be gathered as the scene is filmed. For example, a "trinocular" camera, as described in R. Tanger et al., "Trinocular Depth Acquisition," *SMTPE Motion Imaging Journal*, May/June 2007 (incorporated herein by reference), could be employed. Tanger et al. describe a camera system that includes a main cinematic camera and two "satellite" cameras positioned to the left and right of the main camera. By analyzing the images recorded by these three cameras, it is possible to extract depth information from a live-action scene.

In some embodiments of the present invention, a trinocular camera or other system capable of providing depth information for a live-action scene can be used to support depth composition in post-process without requiring scenes to be re-filmed. For example, the geometry of the scene can be extracted using the depth information, and "virtual" 3-D cameras can be used to record the geometry from a desired position. This approach combines live-action and computer-generated animation techniques.

Figure 8:
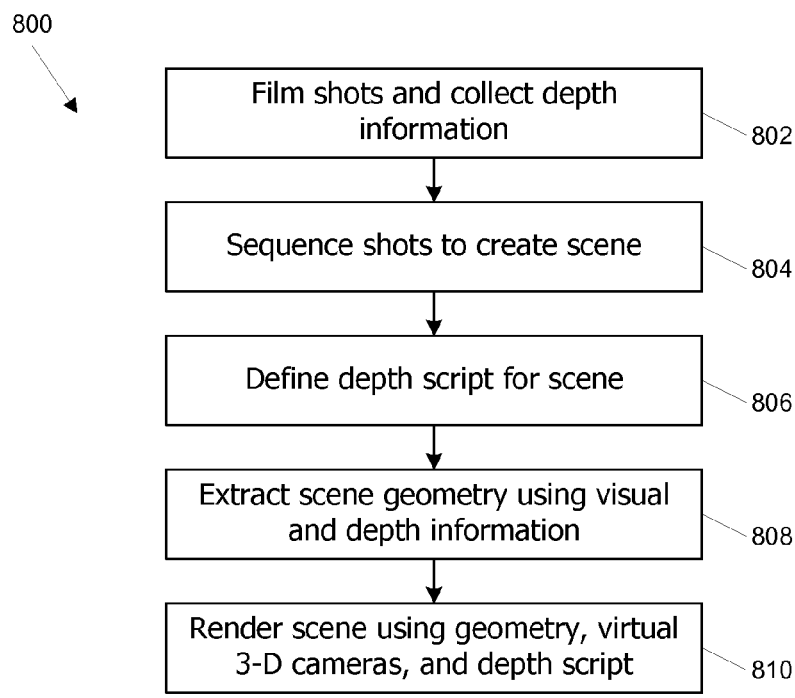
FIG. 8 is a flow diagram of a process for creating a live-action 3-D movie according to an embodiment of the present invention.

FIG. 8 is a flow diagram of a process 800 for creating a live-action 3-D movie according to an embodiment of the present invention. At step 802, shots are filmed using a camera system that provides depth information, such as the trinocular camera system of Tanger et al. At step 804, the director (or other party) sequences the shots to create a scene. It should be noted that at this point, the movie might exist as a two-dimensional (2-D) movie. At step 806, a depth script is defined for the scene. As in process 700, the depth script can be defined by establishing reference parameters for each shot such that there are few or no discontinuous jumps in the viewer's convergence distance.

At step 808, scene geometry is extracted from the visual and depth information collected at step 802, when the scene was filmed. Extracting the scene geometry can include modeling the objects in the scene or other processes for identifying what objects are in the scene and where (in 3-D space) those objects are located. At step 810, the scene is rendered using the extracted geometry and virtual 3-D cameras positioned in accordance with the depth script. In some cases, rendering the scene may also involve creating additional geometry, e.g., to represent objects or portions of objects that were occluded from the original camera angle but become visible in the final 3-D view. The need for such additional geometry will be minor provided that the final 3-D rendering is done from the same camera position as the initial cinematography.

Alternatively, image re-projection techniques can be used. In one such technique, in addition to extracting the geometry, the image is extracted as a texture. The image can then be projected back onto the geometry and recorded from two uniquely chosen points of view representing the left eye and right eye cameras, thereby effecting stereo imagery. Because the camera views can be chosen after the scene edit is made, it is possible to follow a smoothly varying depth script. Image re-projection is a straightforward technique for achieving the desired effect; other techniques may also be used.

It will be appreciated that the depth-scripting processes described herein are illustrative and that variations and modifications are possible. Steps described as sequential may be executed in parallel, order of steps may be varied, and steps may be modified or combined. The processes may be used in combination with each other to create scenes that involve a combination of live-action and computer-generated elements (e.g., scenes with computer-generated visual effects).

These processes allow depth to be composed in post-process rather than during principal photography of a movie. The processes provide increased control over depth, including increased control over how much and how rapidly the viewer's convergence distance varies from shot to shot or scene to scene, better enabling moviemakers to provide a comfortable viewing experience with relatively few abrupt shifts in convergence distance.

While the invention has been described with respect to specific embodiments, one skilled in the art will recognize that numerous modifications are possible. Further, some aspects or embodiments of the invention can be practiced independently of each other; for instance, the techniques described herein for establishing camera parameters can be used independently of the depth scripting techniques, and vice versa.

Some components of the processes described herein can be implemented using suitably-configured computer systems. Such systems may be of conventional design and may include standard components such as microprocessors, monitors, keyboards, disk drives, CD-ROM drives, network interface components, and the like. In addition, interconnected groups of computers may be used to practice the present invention. While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

The techniques described herein can be used to generate images for 3-D, or stereoscopic, movies that can be stored, distributed and displayed using various movie formats and projection or display technology. For example, the sequences of left-eye and right-eye images making up the movie can be printed onto film and projected using a suitably configured projector Alternatively, digital data representing the left-eye and right-eye images can be stored on a computer-readable storage medium (e.g., optical or magnetic disk, flash memory, etc.) and displayed using a computer-based system capable of reading the medium and driving an image-displaying device (e.g., a projector incorporating liquid crystal display or digital micromirror technology) to sequentially display the images. The 3-D effect can be created using conventional techniques (e.g., projecting the left-eye and right-eye frames alternately with coordinated alternating polarization as described above) or any other technique that presents the left-eye images to the left eye and right-eye images to the right eye.

Thus, although the invention has been described with respect to specific embodiments, it will be appreciated that the invention is intended to cover all modifications and equivalents within the scope of the following claims.

What is claimed is:

1. A method for creating a three-dimensional movie, the method comprising:
    defining a depth script for a shot, wherein the depth script specifies values for each of a plurality of reference parameters, the plurality of reference parameters defining a far triangle and a near triangle associated with a stereoscopic image, the plurality of reference parameters including at least two of:
       a focal length for a first camera and a second camera;
       a far distance parameter corresponding to a distance from a plane of the first camera and the second camera to a far plane;
       a near distance parameter corresponding to a distance from the plane of the first camera and the second camera to a near plane;
       a far offset parameter corresponding to an offset distance between a left-eye point and a right-eye point in the far plane;
       a near offset parameter corresponding to an offset distance between a left-eye point and a right-eye point in the near plane; or
       a zero-plane distance parameter corresponding to a distance from the plane of the first camera and the second camera to a zero plane, wherein an offset distance between a left-eye point and a right-eye point in the zero plane is zero,
    wherein the value of each of the plurality of reference parameters is defined as a continuous function of time over a duration of the shot and the value of at least one of the plurality of reference parameters varies over the duration of the shot;
    determining, based on the reference parameter values, camera positioning parameters for the first camera and the second camera, the camera positioning parameters including an interaxial distance between the first camera and the second camera and a film-back offset for at least one of the first camera and the second camera, wherein each of the camera positioning parameters is determined as a continuous function of time over the duration of the shot and at least one of the camera positioning parameters varies over the duration of the shot; and
    obtaining, using the camera positioning parameters, a respective sequence of images for the shot for each of the first camera and the second camera.

2. The method of claim 1 wherein the plurality of reference parameters includes all of:
    the far distance parameter;
    the near distance parameter;
    the far offset parameter; and
    the near offset parameter.

3. The method of claim 2 wherein the values for the far offset parameter and the near offset parameter each correspond to a fraction of a width of the image.

4. The method of claim 1 wherein the plurality of reference parameters includes:
    the far distance parameter;
    a screen distance parameter corresponding to a distance from a plane of the first camera and the second camera to a zero plane, wherein an offset distance between a left-eye point and a right-eye point in the zero plane is zero; and
    the far offset parameter.

5. The method of claim 4 wherein the value for the far offset parameter corresponds to a fraction of a width of the image.

6. The method of claim 1 further comprising:
    defining a depth script for each of a plurality of shots comprising the movie,
    wherein the depth script is defined such that the far triangle and the near triangle vary in a piecewise continuous manner across successive shots in the movie.

7. The method of claim 1 wherein defining the depth script includes:
    determining an apparent width of an object in the shot; and
    selecting at least some of the reference parameter values based on the apparent width of the object.

8. The method of claim 7 wherein the reference parameters include:
    the far distance parameter; and
    a screen distance parameter corresponding to a distance from a plane of the first camera and the second camera to a zero plane, wherein an offset distance between a left-eye point and a right-eye point in the zero plane is zero; and
    wherein the depth script specifies the reference parameter values such that a distance between the far plane and the zero plane is approximately equal to the apparent width of the object.

9. The method of claim 1 wherein obtaining, using the camera positioning parameters, the respective sequence of images for the shot for each of the first camera and the second camera includes:
    determining a first virtual camera position and a second virtual camera position using the camera positioning parameters for the first camera and the second camera, respectively;
    rendering a first image of scene geometry using the first virtual camera position; and
    rendering a second image of the scene geometry using the second virtual camera position.

10. The method of claim 1 wherein obtaining, using the camera positioning parameters, the respective sequence of images for the shot for each of the first camera and the second camera includes:
    filming a live-action shot using a camera system that records depth-related information;
    extracting scene geometry from the live-action shot and the depth-related information; and
    rendering the scene using the extracted scene geometry and image re-projection.

11. The method of claim 1 further comprising:
    storing the sequence of images obtained for each of the first camera and the second camera on a storage medium.

12. The method of claim 11 wherein the storage medium comprises film.

13. The method of claim 11 wherein the storage medium comprises a computer-readable storage medium that stores a digital representation of the sequence of images obtained for each of the first camera and the second camera.

14. The method of claim 11 further comprising:
displaying the images such that an image obtained for the first camera is visible to only one of a viewer's eyes and an image obtained from the second camera is visible to only the other of a viewer's eyes.

15. A method for creating a movie, the method comprising:
obtaining a plurality of shots, each shot comprising a sequence of initial images, each initial image having depth information associated therewith;
sequencing the plurality of shots to create a scene;
defining a depth script for the scene, wherein the depth script specifies values for each of a plurality of reference parameters, the plurality of reference parameters defining a far triangle and a near triangle associated with a stereoscopic image, wherein the value for each of the plurality of reference parameters is specified as a continuous function of time within the scene and the value of at least one of the plurality of reference parameters varies over a duration of the scene; and
regenerating each of the plurality of shots as a sequence of stereoscopic images having depth properties determined based on the depth script and the depth information associated with the initial images, wherein the regenerated shots are regenerated using stereoscopic camera parameters determined from the depth script, the stereoscopic camera parameters including an interaxial distance between a first camera and a second camera.

16. The method of claim 15 wherein obtaining the plurality of shots includes rendering the plurality of shots from scene geometry.

17. The method of claim 16 wherein regenerating the plurality of shots includes re-rendering the plurality of shots from the scene geometry.

18. The method of claim 15 wherein obtaining the plurality of shots includes filming a live-action shot using a camera system that records information usable to extract depth information.

19. The method of claim 18 wherein regenerating each of the plurality of shots includes:
extracting scene geometry from the live-action shots and the depth information; and
rendering a stereoscopic image using the extracted scene geometry and image re-projection.

20. The method of claim 15 wherein the stereoscopic camera parameters further include a toe-in angle for at least one of the first camera and the second camera.

21. The method of claim 15 wherein the reference parameters further include a focal length for the first camera and the second camera and wherein the stereoscopic camera parameters further include a film-back offset for at least one of the first camera and the second camera.

22. A computer program product comprising a non-transitory computer readable storage medium encoded with program code for controlling the operation of a computer system, the program code including:
program code for receiving user input defining a depth script for a shot, wherein the depth script specifies values for each of a plurality of reference parameters, the plurality of reference parameters defining a far triangle and a near triangle associated with a stereoscopic image, the plurality of reference parameters including at least two of:
a far distance parameter corresponding to a distance from a plane of a first camera and a second camera to a far plane;
a near distance parameter corresponding to a distance from the plane of the first camera and the second camera to a near plane;
a far offset parameter corresponding to an offset distance between a left-eye point and a right-eye point in the far plane;
a near offset parameter corresponding to an offset distance between a left-eye point and a right-eye point in the near plane; or
a zero-plane distance parameter corresponding to a distance from the plane of the first camera and the second camera to a zero plane, wherein an offset distance between a left-eye point and a right-eye point in the zero plane is zero,
wherein the value of each of the plurality of reference parameters is defined as a continuous function of time over a duration of the shot and the value of at least one of the plurality of reference parameters varies over the duration of the shot;
program code for determining, based on the reference parameter values, camera positioning parameters for the first camera and the second camera, the camera positioning parameters including an interaxial distance between the first camera and the second camera and a toe-in angle for at least one of the first camera and the second camera, wherein each of the camera positioning parameters is determined as a continuous function of time over the duration of the shot and the value of at least one of the camera positioning parameters varies over the duration of the shot; and
program code for obtaining, using the camera positioning parameters, a respective sequence of images for the shot for each of the first camera and the second camera.

23. The computer program product of claim 22 wherein the plurality of reference parameters includes all of:
the far distance parameter;
the near distance parameter;
the far offset parameter; and
the near offset parameter.

24. The computer program product of claim 22 wherein the plurality of reference parameters includes:
the far distance parameter;
a screen distance parameter corresponding to a distance from a plane of the first camera and the second camera to a zero plane, wherein an offset distance between a left-eye point and a right-eye point in the zero plane is zero; and
the far offset parameter.

25. A method for creating a shot for a three-dimensional movie, the method comprising:
determining an apparent width of an object in a shot;
establishing a reference parameter value for each of a plurality of reference parameters, the plurality of reference parameters defining a far triangle and a near triangle associated with the shot, wherein at least some of the reference parameter values are established based on the apparent width of the object;
determining, based on the reference parameter values, camera positioning parameters for a first camera and a second camera, the camera positioning parameters including an interaxial distance between the first camera and the second camera, wherein values for at least some of the camera positioning parameters are specified as continuous functions of time within the shot and a value of at least one of the camera positioning parameters varies over a duration of the shot; and obtaining, using the camera positioning parameters, a respective sequence of images for the shot from each of the first camera and the second camera, wherein the camera positioning parameters comprise stereoscopic camera parameters determined at least in part from the apparent width, the stereoscopic camera parameters including the interaxial distance between a first camera and a second camera.

26. The method of claim 25 wherein the reference parameters include:

a far distance parameter corresponding to a distance from a plane of the first camera and the second camera to a far plane; and a screen distance parameter corresponding to a distance from a plane of the first camera and the second camera to a zero plane, wherein an offset distance between a left-eye point and a right-eye point in the zero plane is zero; and wherein the reference parameter values are selected such that a distance between the far plane and the zero plane is approximately equal to the apparent width of the object.

27. The method of claim 25 wherein the camera positioning parameters further include a toe-in angle for at least one of the first camera and the second camera.

28. The method of claim 25 wherein the reference parameters include a focal length for the first camera and the second camera and wherein the camera positioning parameters further include a film-back offset for at least one of the first camera and the second camera.

* * * * *